3,471,598
METHOD OF PRODUCING ABSORBENT MATS
Orlando A. Battista, Yardley, Pa., assignor to FMC Corporation, Philadelphia, Pa., a corporation of Delaware
No Drawing. Continuation-in-part of application Ser. No. 436,371, Mar. 1, 1965. This application Feb. 14, 1966, Ser. No. 527,054
Int. Cl. D04h *13/00*
U.S. Cl. 264—28     9 Claims

ABSTRACT OF THE DISCLOSURE

A water-insoluble, highly absorbent body or mat is formed by preparing an aqueous acidic dispersion of water-insoluble microcrystalline collagen, introducing the dispersion into a mold of the desired configuration and freeze drying the dispersion.

---

This application is a continuation-in-part of application Ser. No. 436,371, filed Mar. 1, 1965, now abandoned.

This invention relates to absorbent masses in the form of mats, sponges, and the like, which are characterized by extremely high absorbency along with excellent dry tensile strength and surprisingly high wet strength, which are particularly useful as absorbent materials in contact with the human skin. In particular, the invention relates to such mats when made from a new water-insoluble, microcrystalline colloidal form of collagen which, because it is water-insoluble even at a pH of 3–4, can be made into mats which are highly resistant to water without further treatment and which may be made extremely resistant to water on treatment with cross-linking agents.

Collagen is the principal building block of the hides and skins of most mammals, including man, and its principal source is hide substance. It also is the chief constituent of many other parts of mammals, such as tendons, intestinal walls, etc. In addition to its principal use—in the manufacture of leather—collagen is also widely used in the preparation of such materials as glue and gelatin. More recently, much study has been directed to the solubilization of collagen and its reconstitution from solution as fibers for use as sutures and fibrous mats for various purposes.

The elementary basic molecular unit of collagen is tropocollagen, sometimes called procollagen. This unit has been isolated and electron micrographs made, so that its structure is well understood. The macromolecules consist of three polypeptide chains coiled together in a long helix, about ten to fifteen angstrom units in diameter and about three thousand angstrom units (0.3 micron) long. Tropocollagen is insoluble in neutral water, but is soluble in certain salt solutions and in dilute acid solutions having a pH of about 3. Much of the work done in the production of reconstituted collagen products has involved the conversion of fibrous collagen to acid-soluble tropocollagen usually employing relatively severe acid pretreatments whereby the collagen fibers and fibrils are reduced to tropcollagen molecules as above described followed by reprecipitation of the molecularly dispersed tropocollagen into a reconstituted form. A typical example of this procedure is disclosed in U.S. Patent No. 3,157,524.

The next higher organized state in which collagen has heretofore been known is the collagen fibril, which consists of long, thin strands comprising thousands of individual tropocollagen units; the fibrils may be several hundred to a thousand angstrom units in diameter, and vary in length, generally being tens of microns long. In this form, the collagen is initially water-insoluble, not only at the neutral point but also in acidified water at a ph of 3. It is these fibrils which associate to form the macroscopic fibers present in natural substances and which fibers comprise many thousands of fibrils bonded together.

The art has long worked with these collagen fibers with the thought of using them for the formation of water-absorbent mats or sponges which could be used in contact with the human skin. Orginally, what was attempted was the breaking down of the fibers of the hide into their individual molecular units by solubilizing them and then reconstituting them into batts. This process is extremely difficult and expensive, so that the batts could not possibly compete with the simple cellulosic batts commonly used for the purpose.

The second type of approach is disclosed in U.S. Patent No. 3,157,524. This patent discloses that batts or sponges may be formed by freezing an acidified collagen gel comprising substantial amounts of tropocollagen, after which the water is sublimed under high vacuum while maintaining the temperature below the freezing point. The patent points out that such products redissolve in water and attempts to neutralize the acid in the freeze-dried product by aqueous alkaline solutions destroys the desired foam-like texture and produces a mat structure that loses much of its utility. The patentee overcomes this difficulty by freezing a gel of water-dispersible, acid treated collagen fibers, immersing the frozen mass in a circulating bath of a water-miscible solvent containing an alkaline agent to neutralize the acid whereby the collagen fibrils are dehydrated and coagulated and the salt formed by the neutralization is removed, and subsequently again drying the resultant collagen mass to form a sponge-like mat which will resist dissolution in water.

The use of this method for neutralization is both slow and costly, and involves several processing steps which are expensive. Moreover, there is some loss of porosity in the sponges due to collapse in the organic solvent. Most importantly, the reconstituted collagen has lost its original morphology, and the natural bonds between the tropocollagen units present in the original fibrils are substantially weakened by the solubilization, regeneration and neutralization steps used.

In my copending application Ser. No. 436,371, filed Mar. 1, 1965, I have described a new form of microcrystalline collagen. The present application is directed specifically to the utilization of this new form of collagen in the production of water-insoluble fibrous mats having remarkably high water absorbency properties, without any need for neutralization of the constituent acid, the mats having outstanding softness, bulk, and textures resembling human skin.

In accordance with this invention, I first produce my new form of collagen, which is a distinctly new physical state intermediate between that of swollen collagen fibers and of the tropocollagen molecules disclosed in the above patent. This new physical form of collagen is microcrystalline and colloidal; it consists of bundles of aggregated tropocollagen units which vary in length from that of an individual tropocollagen unit to just under one micron, and in diameter from about twenty-five angstrom units to some hundreds of angstrom units. Compositions comprising various forms of collagen, at least about ten percent by weight of which comprises my new submicron microcrystalline colloidal collagen particles, and which are substantially free of tropocollagen and degraded derivatives thereof, produce viscosity-stable aqueous gels at low concentrations, of the order of one percent.

When these microcrystalline colloidal collagen gels are freeze-dried, a mat is produced which is notable for its ability not to disintegrate in water, even after days of exposure, and for its high absorptive capacity for water and other liquids. These sponge-like mats still contain all of the very small amount of acid used in making the colloidal collagen; no neutralization whatsoever is made. This is possible because of the strict control of acid concentration in combination with appropriate mechanical disintegration to produce the microcrystalline, water-insoluble particles and to preclude true solution, in sharp contrast to products made in accordance with the above patent, where the collagen has been solubilized and repre-cipitated. A this stage, the particles are completely undenatured, there has been a minimal disruption of the original lateral bonding forces between the tropocollagen units comprising the original fibrils and many of the original lateral natural bond forces remain substantially unchanged.

In another aspect of this invention, small amounts of typical collagen cross-linking agents such as alum are incorporated in the mats, preferably being added prior to freezing, so as to impart substantial wet strength to the mats.

The microcystalline colloidal collagen is prepared from any undenatured collagen in the natural state, either as pieces of original hide, gut, or other high collagen source, but preferably with pieces dried under non-denaturing conditions and chopped up for easier handling. The undenatured collagen is treated under carefully controlled conditions with very dilute acid the pH of which is from about 1.6 to 2.6. Where the source material is wet, the proportion of water present must be taken into consideration in preparing the acid solution to be used in the treatment of the source material. The material is then mechanically disintegrated, in the presence of the dilute acid, until about ten percent or more of the material is reduced to submicron size. It is not essential that all the source material be reduced to submicron size. The product becomes useful when about ten percent has been so reduced, although optimum results are obtained at substantially higher concentrations of the submicron microcrystalline material.

For making microcrystalline colloidal collagen, one essential pretreatment is a thorough soaking of the hide substance or other collagen source material with the appropriate very dilute acid at the required pH.

With hydrochloric acid and a typical vacuum freeze-dried cowhide, it is essential that the pH of the treating solution not exceed about 2.6 to produce the microcrystalline colloidal collagen upon subsequent disintegration. Optimum results are attained with acid solutions having a pH of the order of 2 at 1% solids. Treatment with solutions having a pH of less than about 1.6 causes rapid degradation of molecular weight with an attendant build-up of acid-soluble tropocollagen and other degradation products as evidenced by a marked drop in apparent viscosity.

The action of the acid is three-fold. First, the acid serves to cause a limited swelling of the fibers. Second, there is a limited hydrolysis of selective peptide linkages within the non-crystalline or amorphous regions of the collagen fibrils so that subsequent mechanical disintegration permits a ready fragmentation of the weakened morphology into microcrystalline particles having dimensions intermediate between those of tropocollagen and collagen fibrils. Third, a portion of the acid reacts with free primary amino groups of the collagen to form what may be termed collagen hydrochloride salt which, of course, is ionized in the presence of water.

After the acid treatment, the hide substance, with the acid homogeneously distributed therethrough, is subjected to mechanical attrition to reduce at least about ten percent of the product to submicron size. In general, the preferred disintegrating equipment subjects the particles of treated collagen to high shear against each other, such as the Waring Blendor and the Cowles Dissolver for low solids concentration, causing disruption and effective reduction in size of the sub-fibril microcrystalline aggregates. High shear can be imparted in other ways, as by extrusion through small orifices as by the use of a Bauer Refiner and Rietz Extructor particularly in the case of high (above 5%) solids concentrations, or other known techniques.

Preferably, the disintegration is continued well beyond the point where ten percent of the product is submicron, until fifteen to twenty percent or even much more of this product has been reduced to colloidal size.

Hydrochloric acid has been referred to in the foregoing description and is also used in the examples merely because it is relatively inexpensive and allows ready flexibility and ease of control. Other acids, both inorganic and ionizable organic acids, such as, for example, sulfuric acid, hydrobromic acid, phosphoric acid, syanoacetic acid, acetic acid and citric acid, are satisfactory. Sulfuric acid, for example, is satisfactory, but control of the action is difficult. Citric acid may be substituted for hydrochloric acid, hydrobromic acid, phosphoric acid, cyanoacetic acid, erence to the ability to arrest the swelling and hydrolysis of the collagen fibers at that point whereby the insoluble colloidal material is formed and is retained while preventing the rapid degradation of the material to a soluble product.

Upon completion of the disintegration, the gels produced have a pH of from about 2.6 to 3.8, the specific pH being dependent upon the pH of the treating acid. Preferably, the pH of the gels exhibiting optimum properties is between 3.0 and 3.3. For example, in the preparation of 1% gel, one part of finely ground, vacuum freeze-dried cowhide was treated with 100 parts of a hydrochloric acid solution having a pH of 2.25. After a 15 minute treatment in a Waring Blendor, the gel had a pH of 3.25. A 2% gel was prepared in like manner and had a pH of 3.3. When one gram samples of mats prepared by freeze drying these gels were placed in 100 mls. of distilled water, the partial hydrochloride salt of collagen ionized without a disintegration of the mats and the pH of the water was lowered to a pH of 3.1.

The absorbent mats, sponges or other desired structural bodies are formed by freeze-drying the dispersion or gel preferably at temperatures of at least −5° to −10° C. and subliming the water by maintaining the frozen body under vacuum. Any conventional freeze-drying method and apparatus may be used. The gels may contain from about 0.25% up to 10% or more of the microcrystalline colloidal collagen and the porosity of the freeze-dried products will vary inversely with the solids content of the gel. It is preferred to use gels in the lower portion of the concentration range particularly where the product is to be utilized in contact with the human body. The gels may be partially air-dried prior to freeze-drying to reduce the drying cost, however, such procedure results in some loss in water absorptive capacity of the product. The gel may be spread in a freeze-drying tray to form a layer of the desired thickness or it may be poured into a desired mold form and then subjected to the freeze-drying step.

The products of this invention exhibit water absorption properties at least three times greater than surgical cotton, imbibing at least 50 times their own weight of water. These products do not disintegrate in water. For surgical purposes and as wound dressings, the products are superior to surgical cotton because they are lint-free. Typical products have dry tensile strengths of 28 p.s.i.

For many uses, it is highly desirable to remove as much of the free fatty material present in the microcrystalline collagen acid dispersions prior to freeze-drying them. This removal may be achieved by adding cellulosic fibers in the form of highly bleached kraft wood pulp or microcrystalline colloidal cellulose to the dispersion with appropriate mixing to distribute uniformly the cellulosic material throughout the dispersion. Subsequent filtration of the dispersions, as by a conventional pressure filtration method utilizing layers of cellulosic fabric, cotton batting and the like mounted between suitable foraminous metal plates, results in a significant removal of the natural fatty materials present in the raw material. Alternative procedures to reduce such fatty materials to minimal levels are to extract the raw undried hides with organic liquids such as acetone, that will dissolve fatty materials, or to force the dispersions through cellulose paper or fabric filters under very high pressures. Such filtration steps furthermore help to remove extraneous small amounts of other impurities such as chips of hair and fleshy tissues that are quite undesirable in the finished products.

The wet strength of the mats is quite low although the mats will not disintegrate when immersed in water and retained in the water for extended periods of time. Upon immersion in water, water is absorbed and the mat swells to some extent and then remains in this swollen condition. The tensile strength of the products, particularly the wet tensile strength, may be improved by incorporating in the gel prior to freeze drying other fibers such as unswollen collagen hide fibers, cotton, rayon, nylon, polyesters, wool, carded freeze-dried collagen fibers, etc. The proportion of added fibers may be up to 25% or more based upon the weight of the microcrystalline collagen in the gel.

Greater improvements in the wet strength may be attained by incorporating in the gels cross-linking agents for collagen. These agents may be incorporated in the gel at any time prior to freeze drying. However, it appears that a more homogeneous distribution throughout the product is obtained when these agents are added at the beginning of the attrition stage. Typical cross-linking agents which are satisfactory include the various formaldehyde-base cross-linking agents such as, for example, urea-formaldehyde precondensate and melamine-formaldehyde precondensate, formaldehyde, glyoxal, acetaldehyde, glutaraldehyde, potassium alum, chrome alum, iron alum, basic aluminum acetate, cadmium acetate, copper nitrate, barium hydroxide, water-soluble diisocyanates, etc. The specific cross-linking agent which is utilized will be dependent upon the end use of the products. Obviously, the cross-linking reactions may be accelerated by moderate heating prior to freeze drying and this moderate heating is also advantageous where the higher concentration of microcrystalline collagen are used in that the viscosity of the dispersion may be lowered to some extent. In no instance should temperatures greater than about 90° C. be employed. For medical and surgical uses, the innocuous cross-linking agents such as alums would be preferred.

By means of the cross-linking agents, wet strengths of up to 50% of the dry strengths are obtainable. An additional benefit is provided by the use of certain of the cross-linking agents, namely, an improvement of the heat-resistance of the product. Shrinkage upon heating is substantially improved as is the resistance to discoloration when certain of the cross-linking agents are used. The improvement in the heat resistance both as to shrinkage and discoloration is particularly advantageous where it is desired to sterilize the mats or sponges.

The product may be used wherever absorptive material is desired, for example, in disposable diapers, sanitary napkins, and other catamenial devices, swabs, surgical sponges, industrial and domestic sponges, pads, applicators, tampons, surgical dressings, cigarette filters, and the like.

Typical examples of the invention are given here by way of illustration, and not by way of limitation.

Example 1

Twenty grams of chopped-up cowhide, free of water by freeze-drying was placed in 1980 ml. of a hydrochloric acid solution having a pH of 2 and treated at 25°–30° C. in a Cowles Dissolver, Model IVG, for 15 minutes at 5400 r.p.m., using a four-inch pick-blade. At the end of the attrition, the 1% gel of microcrystalline colloidal collagen was spread in a freeze-drying tray to form a layer ⅛ inch thick, and freeze-dried overnight (−40° to −50° C., vacuum five microns, heating cycle not exceeding 30° C. with condensation of sublimed water at 60° C.). The resultant product was a ⅛ inch mat which absorbed 65 times its own weight of water. The tensile strength of a dry test strip 1 inch in width was 3½ pounds, and the wet strength of a like test strip was quite low, but measurable. The product did not disintegrate on soaking in water.

Examples 2–7

Example 1 was repeated with the exception that various additions were made to the mixture at the beginning of the attrition. In Example 2, there was added one gram of a melamine-formaldehyde condensate (percent based on the weight of the collagen) and a small amount of zinc chloride as accelerator. In Example 3, the melamine-formaldehyde concentration was increased to two grams; in Example 4, to four grams; and in Example 5, to six grams. In Example 6, there was added one gram of polyester staple fiber (¼ inch lengths, 1½ denier per filament), based on the weight of the collagen. In Example 7, the fiber was added along with one gram of melamine-formaldehyde condensate and zinc chloride.

Specimens of each of Examples 1–7 were prepared measuring four inches, by one inch, by ⅛ inch, by cutting the mats parallel to the direction of gel spread in the freeze-drier tray. The tensile strength of the specimens was measured on an Instron tensile tester, applying the tensile force to the long dimension (cross head speed one inch per minute). The wet tensile strength was then measured by first immersing the specimen for two minutes in water at 25° C. and testing immediately. The strengths are shown in Table 1:

TABLE 1

| Example | Percent crosslinking agent | Dry tensile in lbs. | Wet tensile in lbs. | Wet to dry tensile, percent |
|---|---|---|---|---|
| 1 | 0 | 3.50 | <0.1 | |
| 2 | 5 | 4.08 | 0.86 | 21.2 |
| 3 | 10 | 3.26 | 1.46 | 45.0 |
| 4 | 20 | 4.18 | 1.78 | 42.6 |
| 5 | 30 | 3.01 | 1.62 | 53.8 |
| 6[1] | 0 | 3.92 | 0.22 | 5.7 |
| 7[1] | 5 | 4.18 | 0.81 | 19.3 |

[1] Including 5% polyester fiber.

The strength exhibited by the product of Example 1 is equivalent to a dry tensile strength of about 28 p.s.i. It will be noted that the addition of cross-linking agents does not affect the dry strength in any notable fashion, the differences probably being due to experimental error inherent in the test procedure as between the different specimens. However, it will be noted that the relationship of wet tensile to dry tensile levels out at just about ten percent of cross-linking agent, and that the addition of reinforcing fiber increases the tensile slightly.

The water imbibition of the products in grams of water per gram of microcrystalline collagen is shown in the following Table 2, and indicates that there is a slight decrease in the water absorption with cross-linking, but it is negligible in view of the large increase in wet strength.

TABLE 2

| Example: | Imbibition of g. H$_2$O/g. material |
|---|---|
| 1 | 64.7 |
| 2 | 56.5 |
| 3 | 55.7 |
| 4 | 55.7 |
| 5 | 49.9 |
| 6 | 66.9 |
| 7 | 51.8 |
| Surgical cotton | 17.8 |

Example 8

Mats made from ¾% gels of microcrystalline colloidal collagen were prepared in accordance with the method of the foregoing examples, except that there was included in the different mats a variety of cross-linking agents. In each instance, 0.001 mole of the cross-linking agent was added per 100 grams of gel. Mats containing potassium alum, melamine-formaldehyde condensate, basic aluminum acetate, cadmium acetate, chrome alum, copper nitrate, and barium hydroxide were prepared and compared with a similar untreated mat.

Measurements were made of the shrinkage of the mats on heating. Specimens were heated in an oven from 25° C. to 200° C. by 10° or 25° intervals, the specimens being retained in the oven for 1 hour at each temperature. All of the specimens showed a shrinkage not exceeding about 2.5% up to 100° C. and a shrinkage not exceeding 5% up to about 140° C. The control mat and the mat containing melamine-formaldehyde showed an increasing shrinkage which amounted to about 10% at 175° C. and rose to 35% at 200° C. The mat containing copper nitrate had a 10% shrinkage at about 160° C. and a 26% shrinkage at 200° C. The cadmium acetate containing mat had a shrinkage of about 10% at 180° C. and a shrinkage of about 20% at 200° C. The potassium alum and the aluminum acetate containing mats had a shrinkge of about 5% at 150° C. and a shrinkage of 10% at 200° C. The chrome alum mat had a shrinkage of 5% at 170° C. and a shrinkage of 9% at 200° C. The barium hydroxide containing mat had a 5% shrinkage at 180° C. and a shrinkage of 10% at 200° C.

Heating of the mats also showed that no visible deterioration or change of color was noticeable at temperatures up to 100° C. Most of the mats began to exhibit a slight discoloration at 120° C. and the discoloration increased as the temperature increased. However, the mat prepared from the gel containing potassium alum showed no visible color change at 200° C. and remained white in color.

The heat stability of the products is particularly advantageous where it is desired to sterilize the products or when they are to be used in high temperature applications. In such instances, the cross-linking agent may be selected based upon its action on both the shrinkage and discoloration characteristics.

Where higher strength mats are required, gels are used having higher concentrations of the microcrystalline collagen because the strength of the products varies directly with the concentration of the gels. The water absorption of the products, however, varies inversely with the concentration of the gels and, accordingly, for specific applications, it is necessary to take both properties into consideration in the preparation of the original gel.

Obviously, the examples can be multiplied indefinitely without departing from the scope of the invention.

I claim:

1. The method of producing a water-insoluble fibrous body which consists essentially of preparing an aqueous dispersion of a water-insoluble, ionizable salt of collagen that is microcrystalline, at least about 10% by weight of which consists of bundles of aggregated tropocollagen units, each of the bundles having a particle size not exceeding 1 micron, introducing the dispersion into a mold in the structural shape of the body, freezing the dispersion in the mold and subliming the water from the frozen dispersion in the presence of the acid to produce a water-insoluble, absorbent fibrous body capable of swelling without disintegrating when immersed in water.

2. The method as defined in claim 1 wherein the aqueous dispersion has a pH of between about 2.6 and 3.8.

3. The method as defined in claim 2 wherein the aqueous liquid of the aqueous dispersion is a hydrochloric acid solution.

4. The method as defined in claim 2 wherein the aqueous dispersion contains a collagen cross-linking agent.

5. The method as defined in claim 4 wherein the cross-linking agent is potassium alum.

6. The method as defined in claim 2 wherein the dispersion includes an added fiber.

7. The method as defined in claim 4 wherein the dispersion includes an added fiber.

8. The method as defined in claim 1 wherein the aqueous dispersion is prepared by treating an undenatured collagen with an aqueous acidic solution at a pH of between about 1.6 and 2.6 and disintegrating the treated collagen in the presence of the acidic solution until at least about 10% by weight of the treated collagen has been reduced to a particle size not exceeding 1 micron.

9. The method as defined in claim 4 wherein the acidic solution is a hydrochloric acid solution.

References Cited

UNITED STATES PATENTS

| | | | |
|---|---|---|---|
| 3,136,682 | 6/1964 | Tu | 162—151 |
| 3,157,524 | 11/1964 | Artandi | 106—122 |
| 3,256,372 | 6/1966 | Adams | 264—28 |

FOREIGN PATENTS

| | | |
|---|---|---|
| 25,064 | 8/1935 | Australia. |

OTHER REFERENCES

Battista, O. A., and Smith, P. A.: Industrial and Engineering Chemistry, 54, pp. 22–29 (1962), reprint in 264–122.

ROBERT F. WHITE, Primary Examiner

R. R. KUCIA, Assistant Examiner

U.S. Cl. X.R.

264—91, 122

PO-1050
(5/69)

UNITED STATES PATENT OFFICE
CERTIFICATE OF CORRECTION

Patent No. 3,471,598  Dated October 7, 1969

Inventor(s) Orlando A. Battista

It is certified that error appears in the above-identified patent and that said Letters Patent are hereby corrected as shown below:

Col. 2, line 1, "ph" should be --pH--. Col. 3, line 11, "A" should be --At--; line 15, "bond" should be --bonding--. Col. 4 line 15, "syanoacetic" should be --cyanoacetic--; line 19, delete ", hydrobromic acid, phosphoric acid, cyanoacetic acid," and insert --with about equal results. "Ease of control" has ref- --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents